(12) United States Patent
Huffer et al.

(10) Patent No.: US 9,782,946 B2
(45) Date of Patent: Oct. 10, 2017

(54) LAMINATE STRUCTURE WITH ACCESS OPENINGS

(71) Applicant: Sonoco Development, Inc., Hartsville, SC (US)

(72) Inventors: Scott William Huffer, Hartsville, SC (US); Jacob Donald Prue Branyon, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days.

(21) Appl. No.: 14/804,608

(22) Filed: Jul. 21, 2015

(65) Prior Publication Data

US 2017/0021586 A1    Jan. 26, 2017

(51) Int. Cl.
*B32B 3/26* (2006.01)
*B32B 15/08* (2006.01)
(Continued)

(52) U.S. Cl.
CPC .............. *B32B 3/266* (2013.01); *B32B 7/06* (2013.01); *B32B 7/12* (2013.01); *B32B 15/08* (2013.01);
(Continued)

(58) Field of Classification Search
CPC ......... B32B 27/06; B32B 27/08; B32B 27/32; B32B 27/36; B32B 15/088; B32B 15/08;
(Continued)

(56) References Cited

U.S. PATENT DOCUMENTS 3,154,225 A * 10/1964 Wadlinger ........... B65D 77/206
                                                          222/485
3,369,709 A    2/1968 Clauss
(Continued)

FOREIGN PATENT DOCUMENTS

JP         2003/040354        2/2003
WO     WO 2012/008064         1/2012
(Continued)

OTHER PUBLICATIONS

U.S. Appl. No. 14/621,768, filed Feb. 13, 2015, In re: Huffer et al. entitled *Container Having Self-Contained Heater Material.*
(Continued)

*Primary Examiner* — Patricia L Nordmeyer
(74) *Attorney, Agent, or Firm* — Nelson Mullins Riley & Scarborough LLP

(57) ABSTRACT

A laminate structure is provided for forming a package, where the laminate structure allows for access openings to be provided upon peeling of the layers. The access openings may allow air to be introduced to the contents, such as to cause an exothermic reaction for heating items, or may allow product to be dispensed from the package. The laminate structure includes a first layer laminated to a second layer via an adhesive, and score lines are formed in the second layer to define plug areas and non-plug areas. The plug areas are configured to result in a peel interface line that occurs across a constant ratio of plug areas to non-plug areas along a predefined distance of a peel area of the laminate structure. Thus, when the first layer is peeled away from the second layer, the peel force needed remains relatively uniform across the predefined distance.

12 Claims, 5 Drawing Sheets

(51) Int. Cl.
*B32B 7/06* (2006.01)
*B32B 27/06* (2006.01)
*B32B 7/12* (2006.01)
*B32B 27/08* (2006.01)
*B32B 27/32* (2006.01)
*B32B 27/36* (2006.01)
*B65D 65/40* (2006.01)
*B65D 75/58* (2006.01)
*B65D 77/20* (2006.01)
*B65D 81/34* (2006.01)
*B32B 15/088* (2006.01)
*B32B 37/12* (2006.01)
*B32B 38/04* (2006.01)

(52) U.S. Cl.
CPC ............ *B32B 15/088* (2013.01); *B32B 27/06* (2013.01); *B32B 27/08* (2013.01); *B32B 27/32* (2013.01); *B32B 27/36* (2013.01); *B32B 37/12* (2013.01); *B32B 38/04* (2013.01); *B65D 65/40* (2013.01); *B65D 75/5894* (2013.01); *B65D 77/206* (2013.01); *B65D 81/3484* (2013.01); *B32B 2307/724* (2013.01); *B32B 2307/7242* (2013.01); *B32B 2367/00* (2013.01); *B32B 2439/00* (2013.01); *B32B 2439/46* (2013.01); *B32B 2439/70* (2013.01)

(58) Field of Classification Search
CPC   B32B 38/04; B32B 37/12; B32B 7/06; B32B 7/12; B32B 3/266; B32B 2367/00; B32B 2307/724; B32B 2307/7242; B32B 2439/00; B32B 2439/46; B32B 2439/70; B65D 65/40; B65D 75/5894; B65D 77/206; B65D 81/3484
See application file for complete search history.

(56) References Cited

U.S. PATENT DOCUMENTS

| | | | |
|---|---|---|---|
| 3,480,464 A * | 11/1969 | Lacy | B32B 27/00 427/250 |
| 5,164,178 A | 11/1992 | Muysson | |
| 6,315,482 B1 | 11/2001 | Girardot et al. | |
| 6,322,271 B1 | 11/2001 | Girardot et al. | |
| 6,325,565 B1 | 12/2001 | Girardot et al. | |
| 6,406,206 B1 | 6/2002 | Girardot et al. | |
| 6,938,832 B2 | 9/2005 | Sada | |
| 7,686,513 B2 * | 3/2010 | Knoerzer | B65D 31/02 206/831 |
| 7,926,735 B1 | 4/2011 | Mobley | |
| 8,277,121 B2 | 10/2012 | Bell et al. | |
| 8,408,792 B2 * | 4/2013 | Cole | B65D 75/5838 383/106 |
| 9,024,360 B1 | 5/2015 | Huffer et al. | |
| 2007/0110343 A1 | 5/2007 | Buchman et al. | |
| 2007/0263948 A1 | 11/2007 | Buchman et al. | |
| 2009/0154846 A1 | 6/2009 | Buchman et al. | |
| 2013/0174835 A1 * | 7/2013 | Tinker | F24J 1/00 126/263.02 |

FOREIGN PATENT DOCUMENTS

| | | |
|---|---|---|
| WO | WO 2014/186572 | 11/2014 |
| WO | WO 2015/085041 | 6/2015 |

OTHER PUBLICATIONS

Extended European Search Report for corresponding European Application No. 16180314.3 dated Dec. 8, 2016, 8 pages.

* cited by examiner

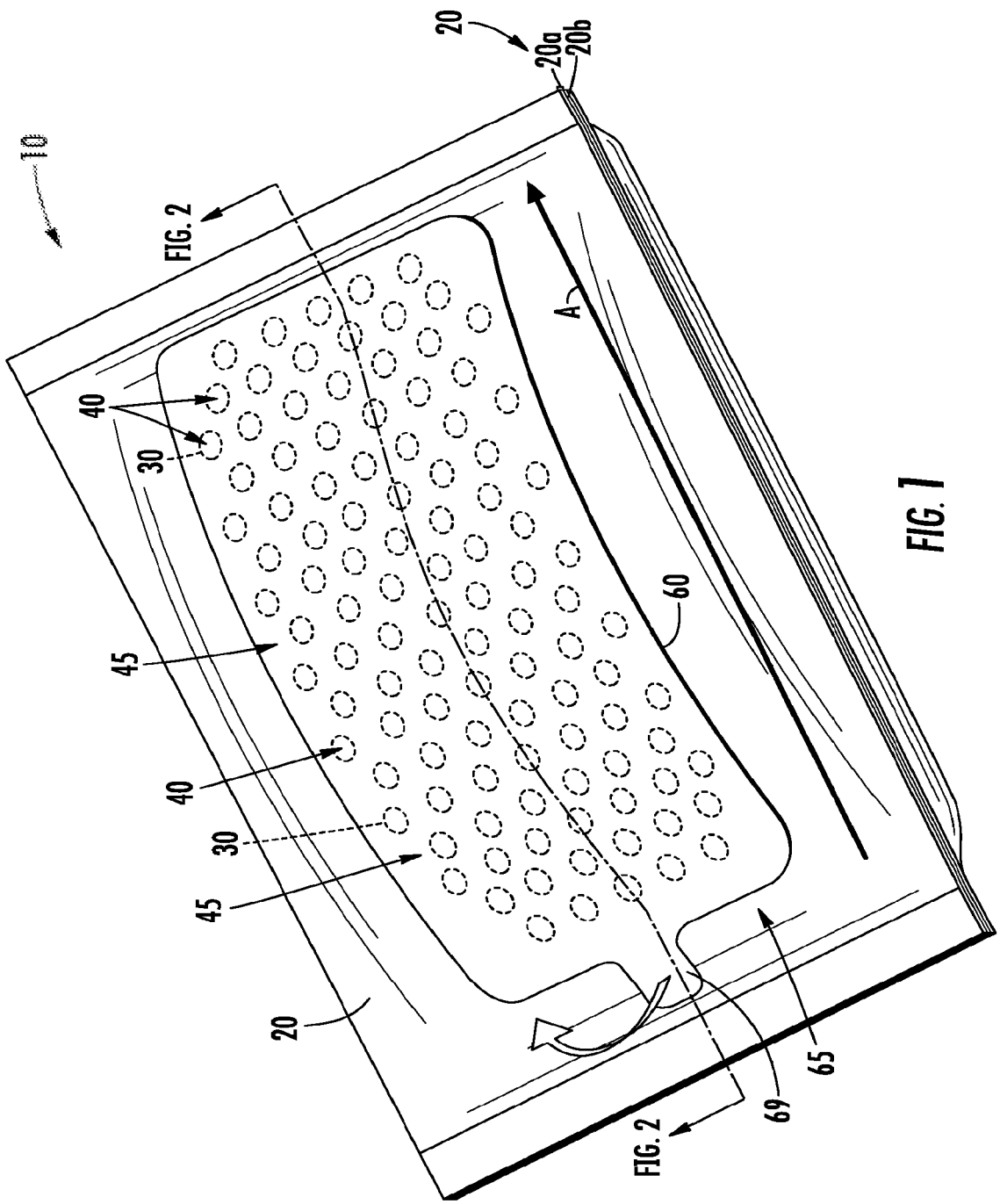

LAMINATE STRUCTURE WITH ACCESS OPENINGS

BACKGROUND

The present disclosure relates to a laminate structure for a package, where the laminate structure has layers that, when peeled apart, provide access openings for allowing air to enter a compartment of the package and/or product to be dispensed from the package. More specifically, the disclosure relates to a configuration of the laminate structure that allows the layers to be peeled to expose the access openings using a more uniform peel force.

Packages for some such products include a built-in compartment containing a heating material that, when exposed to air from the environment, causes the heating material to undergo an exothermic reaction, which in turn provides heat to the contents of the package. Other packages may contain granulated product, and the package may be configured to facilitate dispensing of the package contents. The air may be introduced, and/or the product may be dispensed, via access openings that are created or uncovered by the user.

BRIEF SUMMARY

Accordingly, embodiments of the present invention are directed to laminate structures that provide access openings to allow air to pass through the laminate and/or into product to be dispensed from the package. In particular, embodiments of the laminate structure are provided that include a first layer that is configured to be peeled away from a second layer to create access openings where plug areas are displaced to provide access openings in the second layer. The access openings are designed such that a peel interface line between the first layer and the second layer occurs over a relatively constant ratio of plug areas to non-plug areas. As a result, the peel force needed to peel the first layer from the second layer is relatively constant, thereby facilitating the peeling process and minimizing localized stresses in the package.

In some embodiments, a laminate structure is provided that includes a first layer and a second layer, wherein the first layer is adhered via an adhesive to the second layer, and further includes a plurality of score lines formed in the second layer and defining plug areas and non-plug areas. At least a portion of the first layer is configured to be peeled away from the second layer. The plug areas are configured to be separated and displaced from the second layer upon peeling away of the corresponding portion of the first layer to create openings in the second layer. Moreover, the score lines are configured such that a peel interface line formed between the first layer and the second layer as the first layer is peeled away from the second layer occurs across a constant ratio of plug areas to non-plug areas along a predefined distance of a peel area of the laminate structure.

In some cases, the first and second layers may comprise a first web, and the laminate structure may further comprise a second web disposed adjacent the second layer of the first web and sealed to the first web so as to form a compartment therebetween. Peeling of the first layer away from the second layer may thus allow air to enter the compartment via the openings. For example, the second web may comprise a layer of oriented polypropylene laminated to a layer of metalized oriented polypropylene, and/or the second web may comprise a layer of metal foil laminated between two layers of cast polypropylene.

The plug areas may have a teardrop shape and may be configured in a staggered pattern. The first layer may comprise at least one score line defining at least one peelable portion of the first layer that is configured to be peeled away from the second layer, and the at least one peelable portion may define the peel area. The first layer may comprise poly(ethylene terephthalate) in some cases. Additionally or alternatively, the second layer may comprise metalized oriented polypropylene. In some cases, at least a portion of the first layer may be configured to be re-adhered to the second layer via the adhesive so as to re-close the openings in the second layer.

In other embodiments, a laminate structure is provided that includes a first layer and a second layer, wherein the first layer is adhered via an adhesive to the second layer, and further includes a plurality of score lines formed in the second layer and defining plug areas and non-plug areas. At least a portion of the first layer is configured to be peeled away from the second layer, and the plug areas are configured to be separated and displaced from the second layer upon peeling away of the corresponding portion of the first layer to create openings in the second layer. The score lines are configured such that a peel force for peeling of the first layer away from the second layer is substantially constant along a predefined distance of a peel area of the laminate structure.

In some cases, the plug areas may have a teardrop shape and may be configured in a staggered pattern. The first layer may comprise at least one score line defining at least one peelable portion of the first layer that is configured to be peeled away from the second layer, and the at least one peelable portion may define the peel area. The first layer may comprise poly(ethylene terephthalate), and/or the second layer may comprise metalized oriented polypropylene. At least a portion of the first layer may be configured to be re-adhered to the second layer via the adhesive so as to re-close the openings in the second layer.

In still other embodiments, a method of making a laminate structure is described that comprises laminating a first layer to a second layer, wherein the first layer is adhered to the second layer, and forming a plurality of score lines in the second layer to define plug areas and non-plug areas. At least a portion of the first layer is configured to be peeled away from the second layer. The plug areas are configured to be separated and displaced from the second layer upon peeling away of the corresponding portion of the first layer to create openings in the second layer. Moreover, the score lines are configured such that a peel interface line formed between the first layer and the second layer as the first layer is peeled away from the second layer occurs across a constant ratio of plug areas to non-plug areas along a predefined distance of a peel area of the laminate structure.

In some cases, laminating the first and second layers may comprise laminating the first and second layers to form a first web, and the method may further comprise disposing a second web adjacent the second layer of the first web and sealing the first web to the second web so as to form a compartment therebetween. Additionally or alternatively, forming a plurality of score lines may comprise configuring the score lines such that a peel force for peeling of the first layer away from the second layer is substantially constant along a predefined distance of a peel area of the laminate structure. Moreover, forming a plurality of score lines may comprise defining the plug areas to have a teardrop shape and to be arranged in a staggered pattern. In some cases, the method may further comprise forming at least one score line in the first layer to define at least one peelable portion of the first layer that is configured to be peeled away from the second layer.

BRIEF DESCRIPTION OF THE SEVERAL VIEWS OF THE DRAWINGS

Figure 2A:
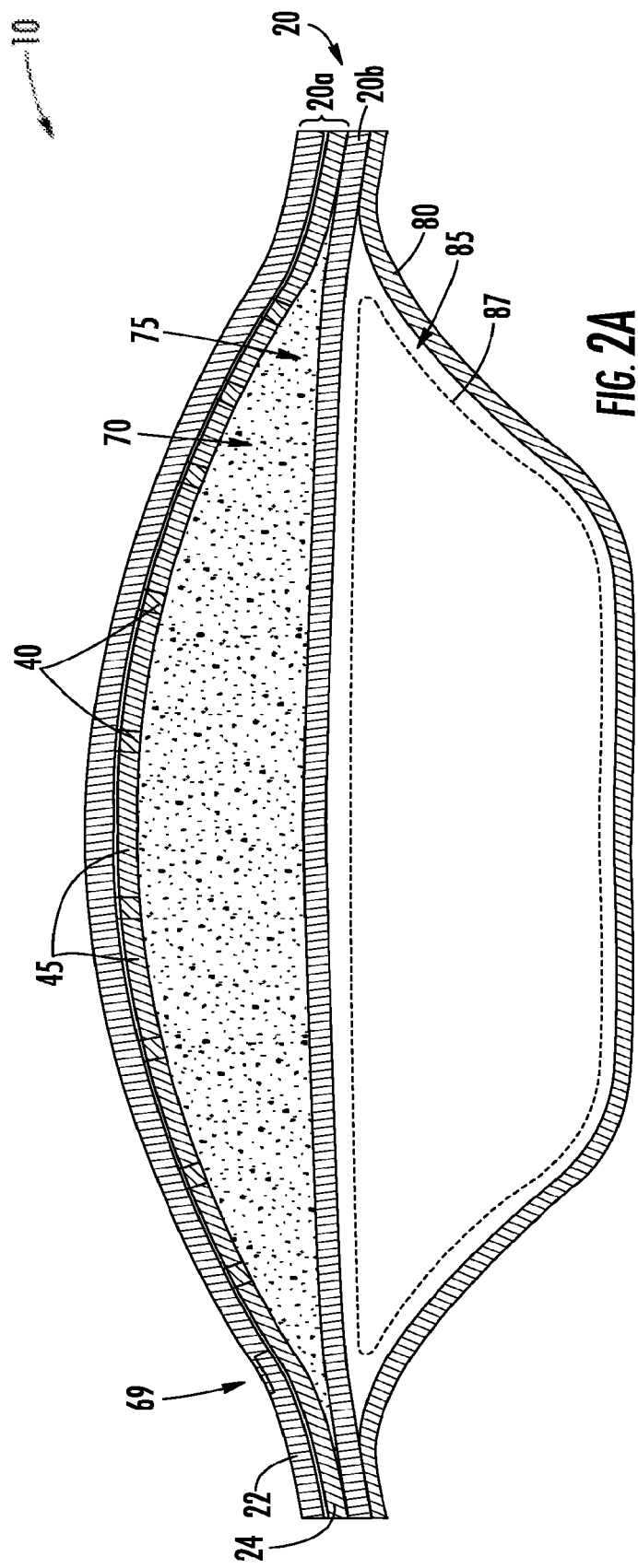
Figure 2B:
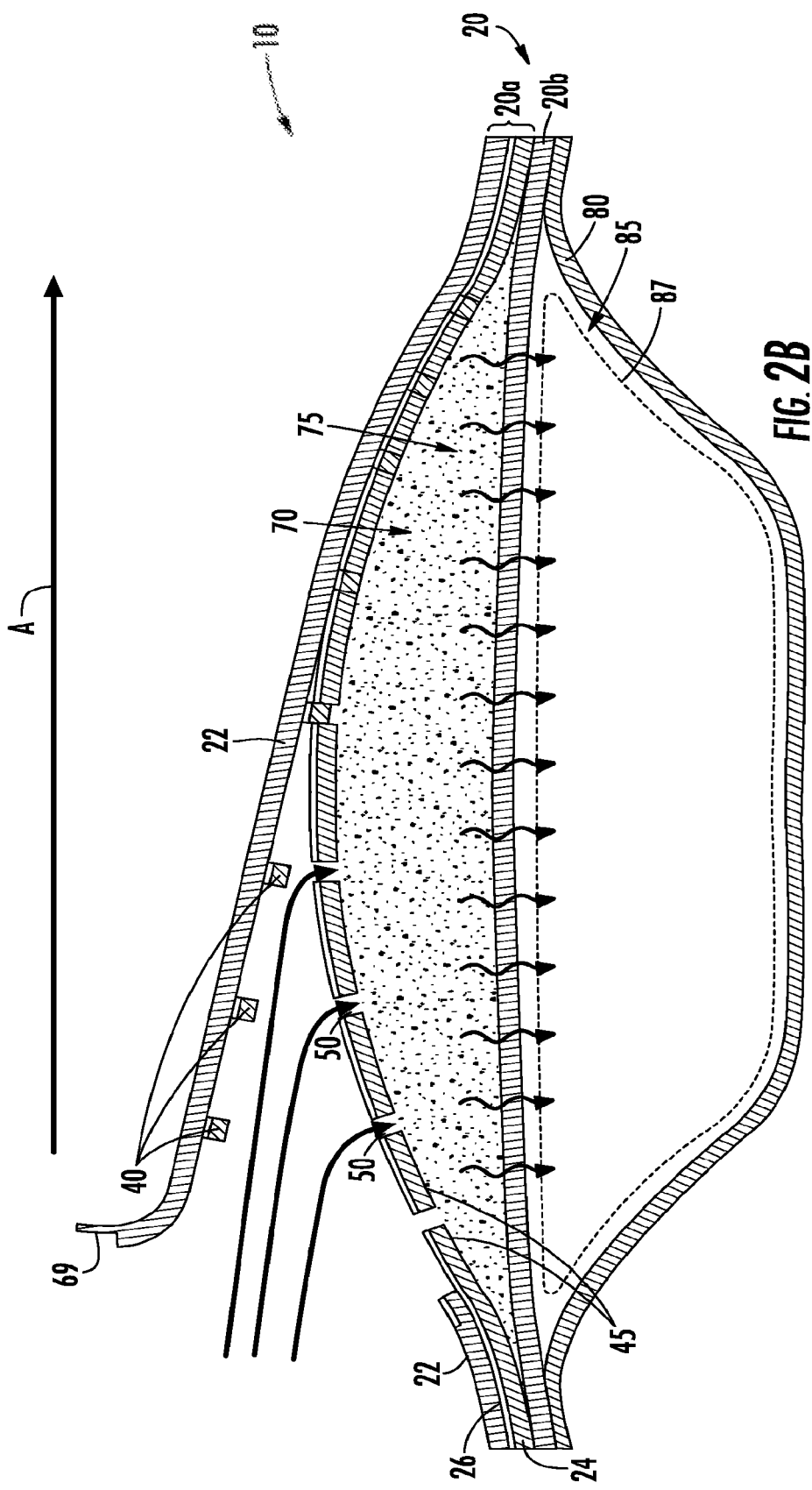
Figure 3:
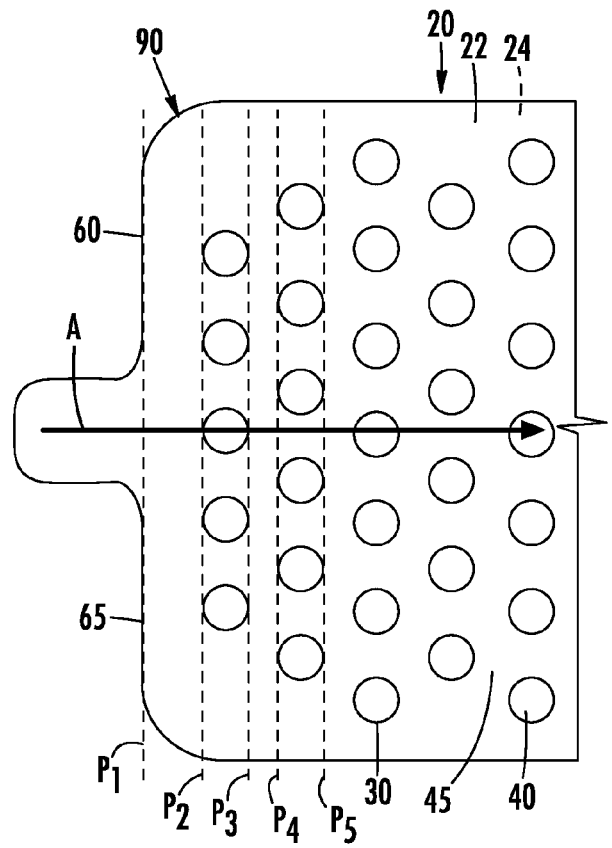
Figure 5:
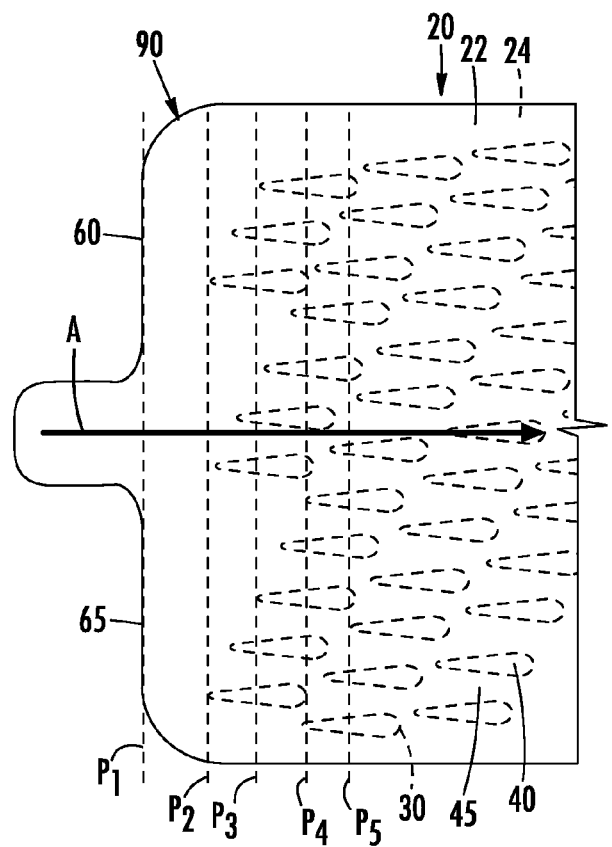
Figure 4:
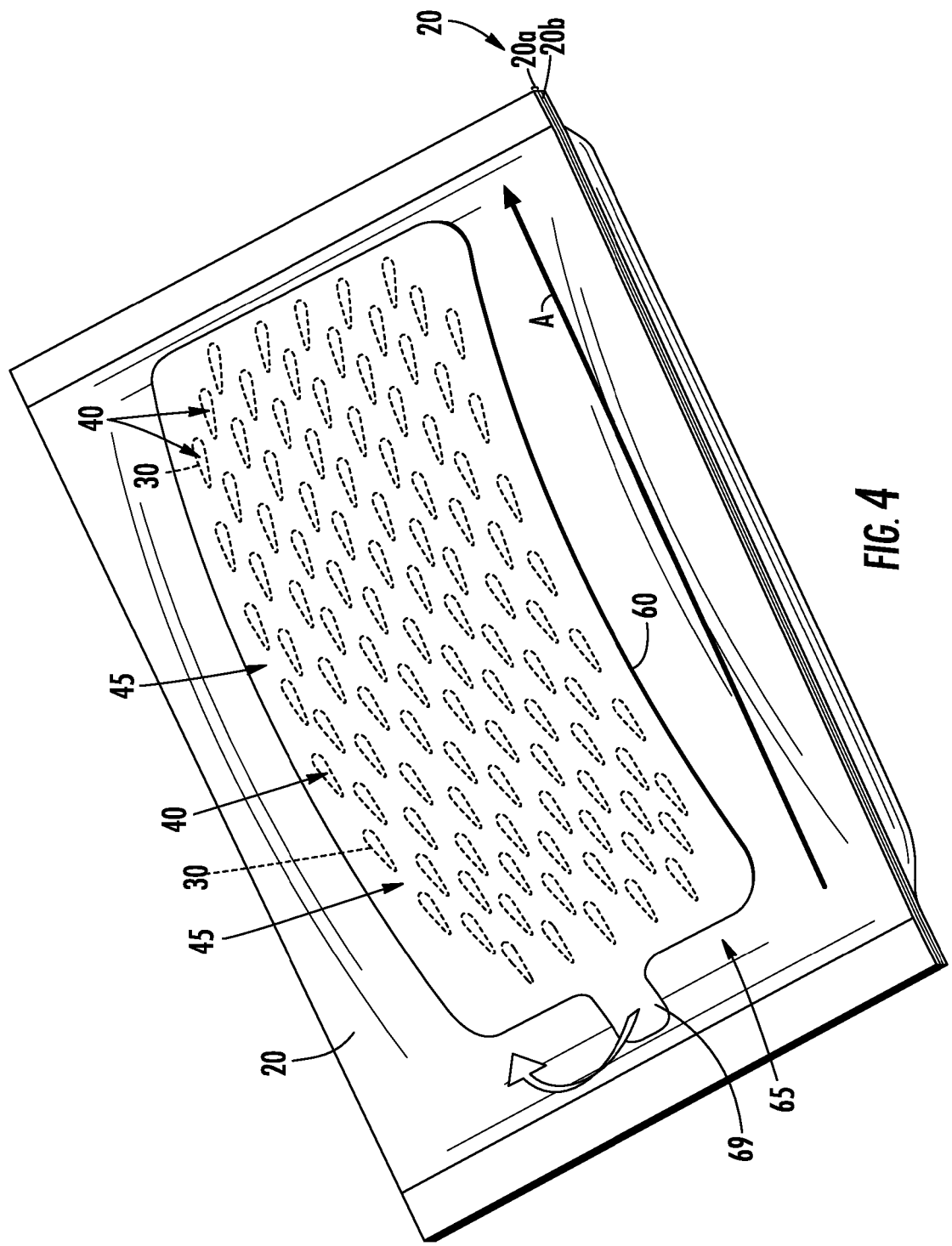

Having thus described the disclosure in general terms, reference will now be made to the accompanying drawings, which are not necessarily drawn to scale, and wherein:

FIG. 1 is a perspective view of a package having a laminate structure with openings;

FIG. 2A is a cross-sectional view of the container of FIG. 1;

FIG. 2B is a cross-sectional view of the container of FIG. 2A after the first layer is partially peeled away from the second layer;

FIG. 3 is a partial top view of a laminate having openings of a circular shape and arranged in a row configuration;

FIG. 4 is a perspective view of a package having a laminate structure according to embodiments of the present invention with openings of a teardrop shape and arranged in a staggered configuration; and FIG. 5 is a partial top view of the laminate of FIG. 4 according to embodiments of the present invention.

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Conventional packages and containers come in various shapes and sizes and can include special features to facilitate opening, closure, tamper prevention or detection, and/or use or consumption of the product contained within the package. Some types of packages may, for example, include a peelable membrane that, when peeled away from the package, creates or reveals openings that may be used to allow air to enter into the package and/or to allow product to be dispensed from the package.

Applications that may fall into the former category, in which air is allowed entry upon peeling of the membrane, may include those in which the package has a self-contained heating element that undergoes an exothermic reaction when the heating material is exposed to oxygen in the air. The heat generated from this reaction in turn heats up the package and its contents, which may be useful for preparing a food item stored therein for consumption, as well as for other purposes (e.g., as a portable heating element for emergency medical procedures, etc.). Examples of packages in which air access openings are provided are described in U.S. Pat. No. 9,024,360, issued May 5, 2015, and U.S. Ser. No. 14/621,768, filed Feb. 13, 2015, both of which are titled "Container Having Self-Contained Heater Material" and the contents of both of which are incorporated herein by reference.

In other cases, as mentioned above, the product stored within the package may be of a granular nature, and the package may be configured to facilitate dispensing of the package contents. Thus, openings may be created or revealed upon peeling away of a membrane on such packages, such that the user may dispense the product (e.g., grated cheese, salt, powder detergent, etc.) via the openings.

The peelable membrane may be a layer of a flexible material that forms part of a laminate. The membrane may be adhered to another layer of the laminate using a pressure sensitive adhesive, for example, such that a consumer of the product held within the package can pull the membrane away from the rest of the laminate to expose the openings. Through hard work and applied ingenuity, the inventors have discovered that the areas between openings, where the adhesive is present to hold together the peelable membrane and the adjacent layer of the laminate, require a relatively high peel force to peel away the membrane. In the areas corresponding to the location of the openings, however, less force is required because no peeling is done at the actual location of the opening. As a result, the peeling of such membranes in conventional packages tends to create a "chatter" effect, as the force required to be applied by the user changes between the portions having openings and those not having any. In addition to possibly causing annoyance or frustration to the user, the fluctuating forces involved may cause packages to wrinkle and/or tear in regions where the stresses (corresponding to high peel force areas) are concentrated, such as at the openings.

The inventors have further discovered that by changing the shape and position of the openings across the area that is peeled, the force required to peel apart the layers can be held relatively constant, such that the "chatter" effect is minimized and the risk of damaging the package during the peeling process is reduced, if not eliminated.

With reference now to FIGS. 1, 2A, and 2B, an example package 10 is illustrated that includes a laminate structure 20 having a first layer 22 and a second layer 24. The first layer 22 may be adhered via an adhesive 26, such as a pressure sensitive adhesive (PSA), to the second layer 24, such that at least a portion of the first layer can be peeled away from the second layer.

A plurality of score lines 30 may be formed in the second layer 24. The score lines 30 may define plug areas 40 and non-plug areas 45, where the plug areas correspond to areas where the cut portion of the second layer 24 may be moved with the first layer 22 when the first layer is peeled from the second layer 24, such that an opening 50 is created in the second layer where the material of the plug area 40 was removed (as shown in FIG. 2B). Thus, the plug areas 40 are configured to be separated and displaced from the second layer 24 upon peeling away of the corresponding portion of the first layer 22 to create the openings 50 in the second layer. For example, the second layer 24 may be precision scored (e.g., die cut) to define the plug areas 40; however, the material of the second layer 24 within the plug areas 40 may be maintained within the second layer 24 until the first layer 22 (and attached portions of the second layer 24 within the plug areas 40) are peeled away from the second layer 24, so as to avoid creating openings in the second layer where air may prematurely enter and/or product may prematurely be dispensed. In some cases, for example, precision scoring the second layer 24 may involve cutting a score line (e.g., using mechanical or laser die cutting techniques) through the second layer only, such that the score lines 30 do not go through the adhesive 26.

It is understood, however, that in some cases the plug areas 40 may not include material from the second layer 24, in that the openings 50 may not be "plugged," but rather may only be covered by corresponding portions of the first layer 22. In such cases, the plug areas 40 may correspond to areas of the first layer 22 that cover the openings 50 formed in the second layer 24 by the score lines 30, and peeling away of the first layer 22 may serve to reveal the openings 50 by displacing the first layer from the second layer (without displacing respective portions of the second layer).

In some cases, the first layer 22 may further include at least one score line 60 that defines at least one peelable portion 65 of the first layer 22 that is configured to be peeled away from the second layer 24. The at least one peelable portion 65 may define a peel area (e.g., an area over which the first layer 22 is peeled away from the second layer 24). With reference to FIGS. 1, 2A, and 2B, for example, at least a portion of the first layer 22 may be configured to be peeled away from the second layer 24 via a pull tab 69 or other portion of the first layer 22.

The pull tab 69 may be a region of the first layer 22 that is not laminated to the second layer 24 (e.g., an area where there is no adhesion between the first and second layers), such that a user can grasp the pull tab and pull the first layer 22 away from the second layer 24, separating the two layers at the interface formed by the adhesive 26. For example, the pull tab can be formed by providing an adhesive-free "knock-out" region between the first and second layers 22, 24 that is bounded by an edge of the score line 60 forming the at least one peelable portion 65 that goes through at the first layer 22 (as shown, for example, in FIG. 1).

In some embodiments, such as in the depicted example, the laminate structure 20 may include two webs of material. The first web 20a may include the first and second layers 22, 24, as described above, and a second web 20b may be disposed adjacent the second layer 24 of the first web 20a and may be sealed to the first web so as to form a compartment 70 therebetween (shown in FIGS. 2A and 2B). In the depicted embodiment, the compartment 70 may be used to hold a self-contained heating material 75 that is configured to react with oxygen from the air, as described above, to generate heat once the first layer 22 is displaced from the second layer 24 and air is allowed to enter through the openings 50 to contact the heating material. In other embodiment, the compartment 70 may be used to hold product to be dispensed via the openings 50. In still other embodiments, the package 10 may include additional webs of material, such as a third web 80 that is sealed to the laminate structure 20 (e.g., the first web 20a and/or the second web 20b, depending on the embodiment and the webs present) to create an enclosed holding space 85 in which food or other product 87 to be heated can be stored, as shown in FIGS. 2A and 2B.

In addition to the size and/or shape of the package 10, the materials forming the first, second, and/or third webs 20a, 20b, 80 may be selected to impart various properties to the package that may allow for better storage of the particular contents (e.g., by improving the shelf-life of the contents or preserving freshness, taste, appearance, texture, etc. of the product), easier access to or delivery of the contents stored therein, and/or a better consumption experience. Moreover, as noted above, the material of the first and/or second webs 20a, 20b forming the compartment 70 in which the air-activated material of some embodiments is held may be selected to increase the shelf-life of the heater material itself, thereby prolonging the usability of the package.

For example, in some embodiments, the first layer 22 of the first web 20a may comprise or consist of poly(ethylene terephthalate) (PET) or other polymer material with appropriate oxygen and moisture barrier properties. Furthermore, in some embodiments, the second layer 24 of the first web 20a may comprise or consist of metalized oriented polypropylene (mOPP) or other metalized films to further provide a barrier with respect to the passage of light, moisture, and oxygen, while at the same time providing adequate toughness and allowing the layers to be heat sealed to other layers and webs to form the package, as described in greater detail below. In some cases, the metalized material of the second layer 24 may further serve as a heat shield, such as to allow the exothermic reaction occurring at the air-activated material 75 in some embodiments to more efficiently heat the contents (e.g., by directing the heat towards the contents and reducing the amount of heat that is lost to the ambient environment).

Similarly, in embodiments including a second web 20b, the second web may comprise a layer of oriented polypropylene (OPP) laminated to a layer of mOPP. In still other embodiments, the second web 20b may comprise a layer of metal foil laminated between two layers of cast polypropylene.

In some cases, the third web 80 may comprise multiple layers, as well. For example, the third web 80 may comprise or consist of a layer of PET laminated to a layer of mOPP, such that the additional web can be heat sealed to the first web 20a and/or the second web 20b to provide the enclosed holding space 85. At the same time, the presence of the metalized film can act as a heat shield as described above to direct the heat from the air-activated material 50 (in the respective embodiments) that may otherwise have a tendency to escape from the package (e.g., passing through the holding space 85 and out the other side) to be re-directed back to the holding space to heat the contents 87. In some embodiments, the layer of PET may be disposed closest to the holding space 85, with the layer of mOPP being disposed on an outer surface of the PET layer.

Although certain materials are described above for forming the first and second layers 22, 24 of the first web 20a, other materials may be used as appropriate for providing the same or similar oxygen and moisture barrier properties to the package. Moreover, in some cases, a further coating or layer may be applied to the outer surface of the first web 20a, adjacent the first layer 22, which may serve as an additional oxygen barrier. For example, the first web 20a may, in some embodiments, comprise a third layer (not shown) disposed adjacent the first layer 22, where the third layer comprises an oxygen barrier. In addition, other materials, layers, pigments, etc. may be added to the structure of the first web 20a to enhance the appearance, manufacturability, or barrier properties of the first web.

According to conventional designs, the score lines 30 are typically configured (e.g., sized, shaped, and positioned) such that the plug areas 40 have a circular shape and are arranged in rows with respect to a peel direction A of the first layer 22 (e.g., the nominal direction in which the peelable portion is peeled away from the rest of the laminate structure 20). An example of this type of configuration for the score lines 30 is shown in FIGS. 1, 2A, 2B, and 3. With reference to FIG. 3, which shows the first layer 22 with the second layer 24 and score lines 30 underneath the first layer 22, the score lines 30 are configured such that a peel interface line formed between the first layer and the second layer as the first layer is peeled away from the second layer occurs at positions along a predefined distance of the peel area that alternate between intersecting plug areas 40 and non-plug areas 45, as described in greater detail below. In this regard, the peel interface line may be thought of as the linear boundary between the separated area of the first and second layers 22, 24 and the not yet separated area that is generally perpendicular to the peel direction A. Thus, as the user peels the first layer 22 away from the second layer 24, the peel interface line will move from left to right in the example shown in FIG. 3 (e.g., in the peel direction A).

Reference positions P1, P2, P3, P4, and P5, shown in FIG. 3, for example, illustrate that as the first layer 22 (e.g., the peelable portion 65) is peeled away from the laminate structure along the peel direction A, the peel interface line will initially occur in a region in which there are no openings present, such as from P1 to P2. Thus, as the first layer 22 is being removed and the peel interface line travels between P1 and P2, the entire length of the peel interface line would occur in non-plug areas 45. Because the non-plug areas 45 have adhesive holding the first and second layers 22, 24 together, a greater amount of force must be applied by the user to separate the layers.

In contrast, as the peel interface line reaches position P2, the peel interface line begins to occur in the plug areas 40, as well as in the non-plug areas 45. Thus, less than the entire length of the peel interface line between P2 and P3 occurs in the non-plug areas 45, and relatively less force is required to displace the layers from each other as compared to between P1 and P2. For example, at position P2 (the beginning of the row of openings), the plug area 40 is at a minimum, and relatively more force is required to peel the first layer 22, whereas at a point halfway between P2 and P3, the peel interface line occurs along a maximum-length secant line of the respective row of openings (e.g., along the diameter of the openings), such that relatively less force is required to peel the first layer 22. Past the halfway point, the cumulative length of the intersecting secant lines begins to decrease again (corresponding to the peel interface line occurring over more non-plug areas 45 as compared to plug areas 40) until reference position P3, past which the peel interface line would occur only across the non-plug areas 45 once more. As a result, between P3 and P4 relatively greater peel force is required to separate the first layer 22 from the second layer 24.

As described above, the peel force is proportional to a ratio of the length of the peel interface line that occurs across non-plug areas 45 having adhesive holding the first and second layers 22, 24 together to the length of the peel interface line that occurs in plug areas 40. The greater the relative length of the peel interface line that occurs across non-plug areas 45 with adhesive, the greater the amount of peel force needed to overcome the bonding force of the adhesive. Accordingly, as the location of the peel interface line moves along a predefined distance of the peel area 90 (e.g., the area corresponding to the portion of the first layer 22 to be peeled away from the second portion 24, such as the area of the peelable portion 65 in the depicted embodiment), the amount of peel force that is needed to separate the first layer 22 from the second layer 24 fluctuates between a maximum amount and a minimum amount. This is due to the shape of the plug areas 40 being circular, as well to the arrangement of the plug areas in rows, such that there are spaces between adjacent rows where the entire length of the peel interface line occurs in non-plug areas 45 having adhesive.

Turning now to FIGS. 4 and 5, the inventors have discovered that by changing the shape of the openings and re-arranging the position of the openings, the ratio of plug areas to non-plug areas along a predefined distance of the peel area can be made more constant. Additionally or alternatively, the peel force needed to peel the first layer from the second layer along the predefined distance of the peel area can be made more uniform.

In FIGS. 4 and 5, for example, an embodiment of the present invention is shown in which the score lines 30 are configured such that a peel interface line formed between the first layer 22 and the second layer 24 as the first layer is peeled away from the second layer occurs across a constant ratio of plug areas 40 to non-plug areas 45 along a predefined distance of a peel area 90 of the laminate structure 20. The peel area 90 may be, for example, an area corresponding to the portion of the first layer 22 to be peeled away from the second portion 24, such as the area of the peelable portion 65 in the depicted embodiment and described above. In some embodiments, the score lines 30 may be configured such that a peel force for peeling of the first layer 22 away from the second layer 24 may be substantially constant along a predefined distance of the peel area 90 of the laminate structure 20.

For example, the score lines 30 in FIGS. 4 and 5 are configured such that the plug areas 40 have a teardrop shape. The "top" of the teardrop, which would be the first part of the plug area 40 to be intersected by the peel interface line as the first layer 22 is peeled away from the second layer 24 in the peel direction A, is initially narrow, then widens to a maximum width proximate the "base" of the teardrop.

In addition, the plug areas 40 are configured in a staggered pattern, such that there are no longer discrete "rows" of openings running in a nominally perpendicular direction with respect to the peel direction. Rather, as the location of the peel interface line moves from one side of the peel area to the other, the peel interface line will intersect with only some of the plug areas 40 at any given time over the predefined distance. Moreover, due to the tapered shape of the teardrop, as the peel interface line moves over progressively longer secants of some plug areas 40, the peel interface line will begin to intersect with additional plug areas at their shortest secants (at the "top" of those respective teardrops), such that the cumulative increase in the length of the peel interface line occurring over plug areas is gradual. Still further, as the peel interface line moves past some of the initial plug areas 40 intersected as the first layer 22 is peeled further off the second layer 24, new plug areas 40 will be intersected in the same manner (narrow to wide).

With reference to FIG. 5, the peel interface line will initially occur in a region in which there are no openings present, such as between reference positions P1 and P2. Thus, as the first layer 22 is being removed and the peel interface line travels between P1 and P2, the entire length of the peel interface line will occur in non-plug areas 45. Because the non-plug areas 45 have adhesive holding the first and second layers 22, 24 together, a maximum amount of peel force must be applied by the user to separate the layers between reference positions P1 and P2.

Unlike in the scenario shown and described with respect to FIG. 3, however, as the peel interface line is moved past P2, the cumulative length of the peel interface line that occurs across non-plug areas 45 will decrease gradually until a relatively steady state is reached. Thus, as the location of the peel interface line moves from the reference position P2 to P3 to P4, additional plug areas 40 are gradually intersected until a ratio of the cumulative length of the peel interface line occurring across non-plug areas 45 to the cumulative length of the peel interface line occurring across plug areas 40 is relatively constant. Thus, for example, once the peel interface line has been moved to reference position P4, the ratio of plug areas 40 to non-plug areas 45 will be relatively constant, such as from reference position P4 to P5 and beyond, along a predefined distance of the peel area. The predefined distance may be, for example, the distance between two points in the peel direction between which a maximum number of plug areas are intersected by the peel interface line.

Accordingly, in some embodiments, the score lines 30 are configured such that the peel force for peeling of the first layer 22 away from the second layer 24 is substantially constant along a predefined distance of the peel area. In this way, the concentration of forces in localized areas of the laminate (such as between the openings in the second layer) is minimized, and the risk of damaging the laminate during peeling of the first layer is reduced. Moreover, the feel of the opening process is more pleasing to the user, as the user is able to apply a more constant amount of peel force, resulting in a smoother and cleaner opening motion.

As shown in FIG. 5, the peel force required for peeling the first layer 22 away from the second layer 24 may be greater (but may be gradually decreasing) as the peel interface line is being moved between reference positions P1 and P4. The greater peel force in this area may, in some cases, protect against unintentional opening of the package. In other cases (not shown), however, partial openings may be provided between P1 and P4 to allow the peel force for peeling of the first layer 22 away from the second layer 24 to be substantially constant starting from reference position P1 and extending to P5 and beyond.

Although a teardrop shape of the openings 50 is depicted in the figures and described in the examples provided above, other similarly tapered shapes may be used to provide for a substantially constant peel force along a predefined distance of the peel area. In other words, any shape with a relatively sharper initiation point that has a continuous/gradual flow outward into a larger shape. For example, a "house" shaped opening where the "roof" of the house points away from the direction of opening motion (e.g., the roof pointing to the left in FIGS. 4 and 5) would allow for a more uniform peeling experience as compared to a simple rectangular opening.

In some embodiments, at least a portion of the first layer 22 may be configured to be re-adhered to the second layer 24 via the adhesive (e.g., the pressure sensitive adhesive) so as to re-close the openings in the second layer 24. For example, a user may be able to move the first layer 22 back into contact with the second layer 24 by moving the first layer in a direction that is opposite the peel direction A, and the adhesive may serve to maintain the first layer with the second layer in the closed configuration. The adhesive may, in some cases, remain with the second layer 24, such that the first layer 22 is brought back into contact with the adhesive upon reclosure of the openings in the non-plug areas 45. In other cases, however, the adhesive may be configured to remain with the first layer 22, such that the adhesive is displace from the second layer 24 when the first layer is moved away from the second layer. In this case, the first layer 22 and the adhesive may be brought back into contact with the second layer 24 in the non-plug areas 45 upon re-closure of the openings 50.

Embodiments of a method for making a laminate structure 20, such as for use in making a package 10 as described above, are also provided. In some embodiments, the method may include laminating a first layer to a second layer, where the first layer is adhered to the second layer, and forming a plurality of score lines in the second layer to define plug areas and non-plug areas. At least a portion of the first layer may be configured to be peeled away from the second layer, and the plug areas may be configured to be separated and displaced from the second layer upon peeling away of the corresponding portion of the first layer to create openings in the second layer. As described above, the score lines are configured such that a peel interface line formed between the first layer and the second layer as the first layer is peeled away from the second layer occurs across a constant ratio of plug areas to non-plug areas along a predefined distance of a peel area of the laminate structure. In some cases, for example, a peel force for peeling the first layer away from the second layer may be substantially constant along a predefined distance of the peel area.

In some embodiments, the first and second layers may be laminated to form a first web, and the method may further comprise disposing a second web adjacent the second layer of the first web and sealing the first web to the second web so as to form a compartment therebetween.

As described above, the plurality of score lines may be formed by defining the plug areas to have a teardrop shape and to be arranged in a staggered pattern. Moreover, in some cases, at least one score line may be formed in the first layer to define at least one peelable portion of the first layer that is configured to be peeled away from the second layer.

Certain embodiments of a laminate structure 20 for forming a package 10 have been illustrated, but the invention is not limited to the particular type of laminate structure and/or package described. Indeed, embodiments of the invention can be applied to any laminate structure and any package where openings are provided through a layer of the structure and a peel force is needed to separate at least one layer from another layer. Furthermore, embodiments of the invention may be used on packages where only a portion of the package includes the laminate structure, rather than where the laminate structure forms the package. For example, other packages may include a thermoformed base, a paperboard body, etc., and the laminate structure may be applied, attached, adhered, or otherwise affixed to the body of the package to provide the openings as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A laminate structure comprising:
a first web comprising a first layer and a second layer, wherein the first layer is adhered via an adhesive to the second layer; and
a plurality of score lines formed in the second layer and defining plug areas and non-plug areas;
wherein at least a portion of the first layer is configured to be peeled away from the second layer,
wherein the plug areas are configured to be separated and displaced from the second layer upon peeling away of the corresponding portion of the first layer to create openings in the second layer,
wherein the score lines are configured so that the plug areas have a teardrop shape and are arranged in a staggered pattern such that a peel force for peeling of the first layer away from the second layer is substantially constant along a predefined distance of a peel area of the laminate structure,
the laminate structure further comprising a second web sealed to the first web so as to form a compartment therebetween, the compartment holding a self-contained heating material, and a third web sealed to the second web and forming a separate holding space adjacent to the compartment and separated from the compartment by the second web, wherein peeling of the first layer away from the second layer allows air to enter the compartment via the openings so as to activate the heating material.

2. The laminate structure of claim 1, wherein the first layer comprises at least one score line defining at least one peelable portion of the first layer that is configured to be peeled away from the second layer, and wherein the at least one peelable portion defines the peel area.

3. The laminate structure of claim 1, wherein the first layer comprises poly(ethylene terephthalate).

4. The laminate structure of claim 1, wherein the second layer comprises metalized oriented polypropylene.

5. The laminate structure of claim 1, wherein at least a portion of the first layer is configured to be re-adhered to the second layer via the adhesive so as to re-close the openings in the second layer.

6. A laminate structure comprising:
 a first web comprising a first layer and a second layer, wherein the first layer is adhered via an adhesive to the second layer; and
 a plurality of score lines formed in the second layer and defining plug areas and non-plug areas;
 wherein at least a portion of the first layer is configured to be peeled away from the second layer,
 wherein the plug areas are configured to be separated and displaced from the second layer upon peeling away of the corresponding portion of the first layer to create openings in the second layer, and
 wherein the score lines are configured so that the plug areas have a teardrop shape and are arranged in a staggered pattern such that a peel interface line formed between the first layer and the second layer as the first layer is peeled away from the second layer occurs across a constant ratio of plug areas to non-plug areas along a predefined distance of a peel area of the laminate structure,
 the laminate structure further comprising a second web sealed to the first web so as to form a compartment therebetween, the compartment holding a self-contained heating material, and a third web sealed to the second web and forming a separate holding space adjacent to the compartment and separated from the compartment by the second web, wherein peeling of the first layer away from the second layer allows air to enter the compartment via the openings so as to activate the heating material.

7. The laminate structure of claim 1, wherein the second web comprises a layer of oriented polypropylene laminated to a layer of metalized oriented polypropylene.

8. The laminate structure of claim 1, wherein the second web comprises a layer of metal foil laminated between two layers of cast polypropylene.

9. The laminate structure of claim 1, wherein the first layer comprises at least one score line defining at least one peelable portion of the first layer that is configured to be peeled away from the second layer, and wherein the at least one peelable portion defines the peel area.

10. The laminate structure of claim 1, wherein the first layer comprises poly(ethylene terephthalate).

11. The laminate structure of claim 1, wherein the second layer comprises metalized oriented polypropylene.

12. The laminate structure of claim 1, wherein at least a portion of the first layer is configured to be re-adhered to the second layer via the adhesive so as to re-close the openings in the second layer.

\* \* \* \* \*

UNITED STATES PATENT AND TRADEMARK OFFICE
CERTIFICATE OF CORRECTION

| | |
|---|---|
| PATENT NO. | : 9,782,946 B2 |
| APPLICATION NO. | : 14/804608 |
| DATED | : October 10, 2017 |
| INVENTOR(S) | : Huffer et al. |

It is certified that error appears in the above-identified patent and that said Letters Patent is hereby corrected as shown below:

In the Claims

Column 12, Line 16, "7. The laminate structure of claim 1, wherein the second" should read -- 7. The laminate structure of claim 6, wherein the second --.

Column 12, Line 19, "8. The laminate structure of claim 1, wherein the second" should read -- 8. The laminate structure of claim 6, wherein the second --.

Column 12, Line 22, "9. The laminate structure of claim 1, wherein the first" should read -- 9. The laminate structure of claim 6, wherein the first --.

Column 12, Line 27, "10. The laminate structure of claim 1, wherein the first" should read -- 10. The laminate structure of claim 6, wherein the first --.

Column 12, Line 29, "11. The laminate structure of claim 1, wherein the second" should read -- 11. The laminate structure of claim 6, wherein the second --.

Column 12, Line 31, "12. The laminate structure of claim 1, wherein at least a" should read -- 12. The laminate structure of claim 6, wherein at least a --.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*